(12) United States Patent
Zoldi et al.

(10) Patent No.: US 12,530,600 B2
(45) Date of Patent: Jan. 20, 2026

(54) SYNTHETIC DATA GENERATION FOR MACHINE LEARNING MODELS

(71) Applicant: FAIR ISAAC CORPORATION, Roseville, MN (US)

(72) Inventors: Scott Michael Zoldi, San Diego, CA (US); Shafi Ur Rahman, San Diego, CA (US)

(73) Assignee: Fair Isaac Corporation, Minneapolis, MN (US)

( * ) Notice: Subject to any disclaimer, the term of this patent is extended or adjusted under 35 U.S.C. 154(b) by 775 days.

(21) Appl. No.: 17/957,684

(22) Filed: Sep. 30, 2022

(65) Prior Publication Data
US 2024/0112045 A1 Apr. 4, 2024

(51) Int. Cl.
*G06F 16/00* (2019.01)
*G06N 5/022* (2023.01)

(52) U.S. Cl.
CPC ................................ *G06N 5/022* (2013.01)

(58) Field of Classification Search
CPC ............................... G06F 16/21; G06F 16/212
See application file for complete search history.

(56) References Cited

U.S. PATENT DOCUMENTS

| | | | | |
|---|---|---|---|---|
| 12,405,844 B2* | 9/2025 | Goodsitt | ................... | G06N 3/04 |
| 2016/0171380 A1* | 6/2016 | Kennel | ................... | G06N 7/01 |
| | | | | 706/12 |
| 2016/0267397 A1* | 9/2016 | Carlsson | ................... | G06N 3/04 |
| 2020/0334557 A1* | 10/2020 | Kale | ................... | G06N 20/00 |
| 2020/0394541 A1* | 12/2020 | Hazard | ................... | G06F 18/214 |
| 2021/0049456 A1* | 2/2021 | Kursun | ................... | G06N 3/047 |
| 2021/0097343 A1* | 4/2021 | Goodsitt | ................... | G06N 3/088 |
| 2021/0174258 A1* | 6/2021 | Wenchel | ................... | G06N 20/00 |
| 2021/0264466 A1* | 8/2021 | Aggarwal | ................... | G06Q 30/0201 |
| 2021/0326652 A1* | 10/2021 | Hazard | ................... | G06N 5/045 |
| 2021/0397972 A1* | 12/2021 | Walters | ................... | G06N 3/08 |
| 2022/0083445 A1* | 3/2022 | Nyati | ................... | G06N 20/00 |
| 2023/0024796 A1* | 1/2023 | Hazard | ................... | G06N 5/04 |
| 2023/0118240 A1* | 4/2023 | Wong | ................... | G06N 3/08 |
| | | | | 705/44 |
| 2024/0086493 A1* | 3/2024 | Lee | ................... | G06N 3/088 |
| 2024/0112045 A1* | 4/2024 | Zoldi | ................... | G06N 20/00 |
| 2024/0265484 A1* | 8/2024 | Hazard | ................... | G06T 1/0028 |
| 2024/0362421 A1* | 10/2024 | Markov | ................... | G06F 40/216 |
| 2025/0086475 A1* | 3/2025 | Turner | ................... | G06N 3/098 |
| 2025/0086521 A1* | 3/2025 | Farnan | ................... | G06N 20/20 |

* cited by examiner

*Primary Examiner* — Noosha Arjomandi

(57) ABSTRACT

A method may include generating synthetic data based on input data and training a machine learning model based on the synthetic data. The synthetic data may be generated by determining a plurality of data points representing an archetype probability distribution of a plurality of archetypes, clustering the plurality of data points into one or more clusters associated with transactional behavior patterns, generating a threshold metric representing a peak distribution density of the plurality of data points associated with a corresponding cluster, removing, from the plurality of data points, one or more non-representative data points to define a reduced set of the plurality of data points, generating an updated archetype probability distribution based at least on the reduced set of the plurality of data points, and generating representative transaction data based on the updated archetype probability distribution and threshold metric. Related methods and articles of manufacture are al so disclosed.

20 Claims, 15 Drawing Sheets

| Entity ID | Class, c | Cluster, k | Distance, l, (ε) | P (c) |
|---|---|---|---|---|
| E001 | 1 | 1 | 0.01 | 0.99 |
| E002 | 1 | 1 | 0.11 | 0.96 |
| E003 | 1 | 2 | 0.02 | 0.99 |
| ... | ... | ... | ... | ... |
| ... | ... | ... | ... | ... |
| E123 | 2 | 1 | 0.03 | 0.98 |
| ... | ... | ... | ... | ... |

| Class, c | Cluster, k | Centroid ID | Distance from centroid of cluster k, $l_k^c$ |
|---|---|---|---|
| 1 | 1 | E003 | 0.22 |
| 1 | 2 | E271 | 0.17 |
| 1 | 3 | E1191 | 0.32 |
| ... | ... | ... | ... |
| ... | ... | ... | ... |
| 2 | 1 | E981 | 0.13 |
| ... | ... | ... | ... |

1700

GENERATING SYNTHETIC DATA BASED ON INPUT DATA INCLUDING A PLURALITY OF TRANSACTIONS AND A CLASS ASSIGNED TO EACH OF THE PLURALITY OF TRANSACTIONS
1702

TRAINING A MACHINE LEARNING MODEL BASED ON THE GENERATED SYNTHETIC DATA
1704

1800

DETERMINING A PLURALITY OF DATA REPRESENTING AN ARCHETYPE PROBABILITY DISTRIBUTION OF A PLURALITY OF ARCHETYPES FOR AN ENTITY AT A TIME POINT
1802

CLUSTERING THE PLURALITY OF DATA POINTS INTO ONE OR MORE CLUSTERS ASSOCIATED WITH THE ONE OR MORE TRANSACTIONAL BEHAVIOR PATTERNS
1804

REMOVING, FROM THE PLURALITY OF DATA POINTS, ONE OR MORE NON-REPRESENTATIVE DATA POINTS TO DEFINE A REDUCED SET OF THE PLURALITY OF DATA POINTS
1806

GENERATING AN UPDATED ARCHETYPE PROBABILITY DISTRIBUTION BASED AT LEAST ON THE REDUCED SET OF THE PLURALITY OF DATA POINTS
1808

SELECTING REPRESENTATIVE TRANSACTION DATA BASED ON THE UPDATED ARCHETYPE PROBABILITY DISTRIBUTION
1810

FIG. 18

SYNTHETIC DATA GENERATION FOR MACHINE LEARNING MODELS

FIELD

The present disclosure generally relates to machine learning and more specifically to generating synthetic data for machine learning models.

BACKGROUND

Machine learning models can be trained using collected real world transaction data. Many machine learning models rely on a supervised learning process, which uses the historic outcome information, such as tags, for training the machine learning models. However, such machine learning models may produce unreliable results due to the collected real world transaction data. For example, real world transaction data can have quality issues, collection bias, tag uncertainty, and even outcome assignment biases in some circumstances, due to defensive tagging, human bias, or poor assignment of outcomes. Such real world transaction data can negatively impact machine learning model performance.

SUMMARY

Methods, systems, and articles of manufacture, including computer program products, are provided for generating synthetic data for machine learning models. In one aspect, there is provided a system. The system may include at least one processor and at least one memory. The at least one memory may store instructions that result in operations when executed by the at least one processor. The operations may include: generating synthetic data based on input data including a plurality of transactions and a class assigned to each of the plurality of transactions. The synthetic data is generated by at least: determining, for each class, a plurality of data points, each of the plurality of data points representing an archetype probability distribution of a plurality of archetypes for an entity at a time point. The plurality of archetypes represent one or more transactional behavior patterns across the plurality of transactions. The synthetic data may further be generated by at least clustering, for each class, the plurality of data points into one or more clusters associated with the one or more transactional behavior patterns. The synthetic data may further be generated by at least removing, from the plurality of data points, one or more non-representative data points to define a reduced set of the plurality of data points. The removing may be based at least on a metric associated with the one or more non-representative data points failing to meet a threshold metric representing a peak distribution density of the plurality of data points associated with a corresponding cluster of the one or more clusters. The synthetic data may further be generated by at least generating an updated archetype probability distribution based at least on the reduced set of the plurality of data points. The synthetic data may further be generated by at least generating representative transaction data based on the updated archetype probability distribution. The representative transaction data may define the synthetic data. The operations may further include training a machine learning model based on the generated synthetic data.

In some variations, one or more of the features disclosed herein including the following features can optionally be included in any feasible combination. In some variations, the synthetic data is further generated by at least: tokenizing each transaction of the plurality of transactions to generate the plurality of archetypes.

In some variations, the plurality of archetypes are generated by at least applying a second machine learning model to a plurality of documents representing the plurality of tokenized transactions associated with unique entities in the transaction data.

In some variations, a first transaction of the plurality of transactions is associated with the entity and the time point.

In some variations, the plurality of data points are clustered into the one or more clusters by at least applying a clustering technique. In some variations, the clustering technique includes k-means clustering with elbow method.

In some variations, the clustering includes determining a centroid of the one or more clusters.

In some variations, the removing the one or more non-representative data points is further based on the one or more non-representative data points failing to meet a threshold distance from the centroid of the one or more clusters.

In some variations, the removing the one or more non-representative data points is further based on the one or more non-representative data points being associated with at least two classes.

In some variations, the synthetic data is further generated by at least re-clustering, for each class and after removing the one or more non-representative data points, the reduced set of the plurality of data points into one or more updated clusters associated with the one or more transactional behavior patterns.

In some variations, the synthetic data is further generated by at least generating summary statistics based on the reduced set of the plurality of data points and applying the summary statistics to a simulated set of transactions corresponding to one or more simulated entities.

In some variations, the synthetic data is further generated by at least: defining for each of the one or more clusters including the reduced set of the plurality of data points, a centroid and a radius based on the threshold metric.

In some variations, the updated archetype probability distribution is further generated by at least leveraging the centroid, the radius, and the threshold metric.

In some variations, the representative transaction data corresponds to a statistical distribution of transactions associated with each archetype of the plurality of archetypes.

In another aspect, there is provided a method. The method may include: generating synthetic data based on input data including a plurality of transactions and a class assigned to each of the plurality of transactions. The synthetic data is generated by at least: determining, for each class, a plurality of data points, each of the plurality of data points representing an archetype probability distribution of a plurality of archetypes for an entity at a time point. The plurality of archetypes represent one or more transactional behavior patterns across the plurality of transactions. The synthetic data may further be generated by at least clustering, for each class, the plurality of data points into one or more clusters associated with the one or more transactional behavior patterns. The synthetic data may further be generated by at least removing, from the plurality of data points, one or more non-representative data points to define a reduced set of the plurality of data points. The removing may be based at least on a metric associated with the one or more non-representative data points failing to meet a threshold metric representing a peak distribution density of the plurality of data points associated with a corresponding cluster of the one or more clusters. The synthetic data may further be generated by at least generating an updated archetype probability distribution based at least on the reduced set of the plurality of data points. The synthetic data may further be generated by at least generating representative transaction data based on the updated archetype probability distribution. The representative transaction data may define the synthetic data. The method may further include training a machine learning model based on the generated synthetic data.

In another aspect, there is provided a computer program product that includes a non-transitory computer readable storage medium. The non-transitory computer-readable storage medium may include program code that causes operations when executed by at least one processor. The operations may include: generating synthetic data based on input data including a plurality of transactions and a class assigned to each of the plurality of transactions. The synthetic data is generated by at least: determining, for each class, a plurality of data points, each of the plurality of data points representing an archetype probability distribution of a plurality of archetypes for an entity at a time point. The plurality of archetypes represent one or more transactional behavior patterns across the plurality of transactions. The synthetic data may further be generated by at least clustering, for each class, the plurality of data points into one or more clusters associated with the one or more transactional behavior patterns. The synthetic data may further be generated by at least removing, from the plurality of data points, one or more non-representative data points to define a reduced set of the plurality of data points. The removing may be based at least on a metric associated with the one or more non-representative data points failing to meet a threshold metric representing a peak distribution density of the plurality of data points associated with a corresponding cluster of the one or more clusters. The synthetic data may further be generated by at least generating an updated archetype probability distribution based at least on the reduced set of the plurality of data points. The synthetic data may further be generated by at least generating representative transaction data based on the updated archetype probability distribution. The representative transaction data may define the synthetic data. The operations may further include training a machine learning model based on the generated synthetic data.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to generating synthetic data, it should be readily understood that such features are not intended to be limiting. The claims that follow this disclosure are intended to define the scope of the protected subject matter.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 18 depicts a flowchart illustrating an example of a process for generating synthetic data, consistent with implementations of the current subject matter;

Figure 1:
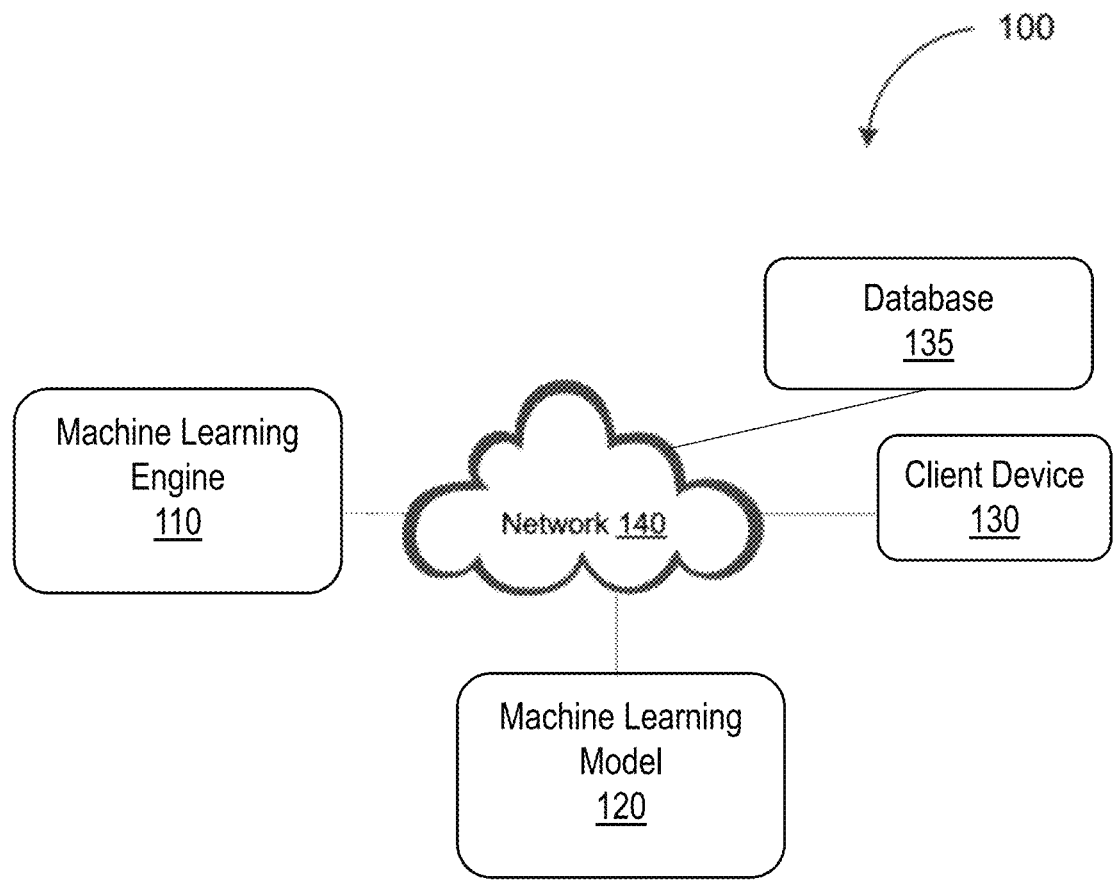
FIG. 1 depicts an example data generation system, consistent with implementations of the current subject matter.

When practical, like labels are used to refer to same or similar items in the drawings.

DETAILED DESCRIPTION

Real world transaction data can be used as training data for training machine learning models. Such real world transaction data can have quality issues, collection bias, and even outcome assignment biases due to defensive tagging, human bias in assigning the outcome, or poor quality in assigning the outcomes. This is further exacerbated by presence of non-representative data points reflecting rare behavior or inaccurate tags for the data. Incorporating synthetic data, consistent with implementations of the current subject matter, in building machine learning models has benefits over using data collected real world transaction data.

For example, machine learning models are generally trained on historical transaction data. The historical transaction data can either represent real customer dynamics or can be corrupted. In some circumstances, the corruption can be due to data capture issues, such as missing data, sampling biases, data mapping issues, or a bad actor deliberately injecting corrupted data. The corrupted transaction data can lead to machine learning models, trained on such data, generating poor or inaccurate predictions. Further, machine learning models are generally trained to learn underlying patterns from the training data, the relationship between the learned patterns, and outcomes to predict a decision boundary. The trained machine learning models can then analyze the patterns of a new data point and predict outcome based on the position of the data point with respect to the predicted decision boundary. In such cases, the presence of non-representative data points representing rare behavior can create unstable decision boundaries, leading to non-robust models. In some circumstances, a bad actor can take advantage of this aspect of machine learning models by injecting data points in the training dataset to reshape the predicted decision boundary. Also, the prevalence of data points with low representation due to data sampling corruption issues is also quite common, leading to the model learning and predicting unstable decision boundaries.

Many machine learning models also rely on a supervised learning process, which rely on historic outcome information, such as historic tags, for training the models. However, historic tags can be inaccurate, under-inclusive, or unpredictable. For example, in the area of anti-money laundering machine models, suspicious activity reports (SARs) can be used as outcome tags to train the predictive machine learning models for automating detection of money laundering. In many instances, the tags are applied inaccurately or incorrectly. Even in seemingly more certain situations such as payment card fraud, the tags of a customer or transaction can change over the period of a case investigation, as the case managers work through each potential fraud case. Moreover, assigned tags may be inherently flawed with varying degrees of uncertainty and accuracy. These tagging errors can negatively impact performance of the machine learning models.

Consistent with implementations of the current subject matter, the data generation system described herein generates improved synthetic data to reduce or eliminate bias and quality issues arising from the manual tagging processes and presence of non-representative data points. Synthetic data can be used to train machine learning models and improve machine learning model performance. Synthetic data is data that reflects the multi-variate statistical distributions of historical transaction history found in real world data generated through a simulation process. In some instances, training machine learning models based on synthetic data can be beneficial over using collected real world data.

In some implementations, the data generation system described herein generates synthetic data without the offending non-representative noise, bias, and uncertainty errors to train a robust machine learning model by, for example, denoising historical data tags and removing data patterns with low representation. To do so, the data generation system learns the transaction manifold of the original training dataset including historical data, projects the historical data onto the transaction manifold, and identifies various transactional behavior clusters. The data generation system may eliminate the clusters that have low signal to noise. After denoising, the data generation system generates the statistical distribution of the remaining data clusters on the transaction manifold. The data generation system employs the statistical distribution and transaction manifold to generate a synthetic dataset. The data generation system may then train a machine learning model based on the generated and improved synthetic dataset.

The data generation system described herein also addresses the issue of privacy. For example, in some circumstances, rather than relying on real-world customer transaction data, the data generation system described herein recreates or simulates transactions of such customers by joining multiple anonymized datasets. In situations where sending customer data is restricted, sending a synthetically generated dataset based on a model of customer behaviors is more feasible with reduced privacy concerns.

Consistent with implementations of the current subject matter, the manifold of the synthetic data generated by data generation system forms the density matrices that define areas of coverage for the resulting machine learning model. The data generation system described herein thus predicts more accurate guiderails and parameters defining areas of coverage for the machine learning model, without extrapolating results, which could otherwise be highly uncertain.

Accordingly, the data generation system described herein reduces or eliminates the uncertainty in the machine learning model quality that arises from poor quality data and tags, and fortifies the machine learning models against intentional data poisoning. For example, the data generation system described herein removes spurious tag information and non-representative and corrupted data, and trains machine learning models using improved synthetic data simulating transaction data and outcomes. Additionally and/or alternatively, the data generation system described herein generates a synthetic dataset preserving important fundamental multivariate statistics through manifold learning, represents all the entities of the real world data on the learned manifolds, eliminates the non-representative, rare, and noisy instances of the entities, and/or trains a machine learning model using the resultant synthetic dataset, providing a robust model given the prescription of dominant behaviors and outcomes. Additionally and/or alternatively, the data generation system described herein provides a measure of tag certainty to allow for understanding the impact of spurious data on tag quality.

FIG. 1 depicts a system diagram illustrating an example of a data generation system 100, consistent with implementations of the current subject matter. Referring to FIG. 1, the data generation system 100 may include a machine learning engine 110, a machine learning model 120, a database 135, and a client device 130. The machine learning engine 110, the machine learning model 120, the database 135, and the client device 130 may be communicatively coupled via a network 140. The network 140 may be a wired network and/or a wireless network including, for example, a wide area network (WAN), a local area network (LAN), a virtual local area network (VLAN), a public land mobile network (PLMN), the Internet, and/or the like. In some implementations, the machine learning engine 110, the machine learning model 120, the database 135, and/or the client device 130 may be contained within and/or operate on a same device. It should be appreciated that the client device 130 may be a processor-based device including, for example, a smartphone, a tablet computer, a wearable apparatus, a virtual assistant, an Internet-of-Things (IoT) appliance, and/or the like.

The machine learning engine 110 includes at least one data processor and at least one memory storing instructions, which when executed by the at least one data processor, perform one or more operations as described herein. The machine learning engine 110 may include a data generation system (e.g., a data generator) for generating synthetic data and/or a machine learning engine for training the machine learning model 120 based on the generated synthetic data. The machine learning model 120 may include a neural network, and/or the like.

The database 135 may store one or more input data and/or output data, as described herein. For example, the database 135 may store input data, such as transaction data. The transaction data may be real world and/or historical data collected based on transactions made by one or more entities (e.g., a customer, an account, a person, a credit card, a bank account, or any other entity whose behavior is being monitored and/or is otherwise of interest, and/or the like). The transaction data may include a plurality of transactions (e.g., purchases, sales, transfers, and/or the like), a class (e.g., a credit default, a fraudulent card transaction, a money laundering transaction, and/or the like) assigned to each of the plurality of transactions, an entity associated with each of the plurality of transactions, a time point associated with each of the plurality of transactions, and/or the like. In some implementations, the transaction data is identified using an identifier (e.g., an "ID") that uniquely distinguishes one entity of the one or more entities from another. The one or more entities may include one, two, three, four, five, ten, one hundred, or more entities.

Figure 2:
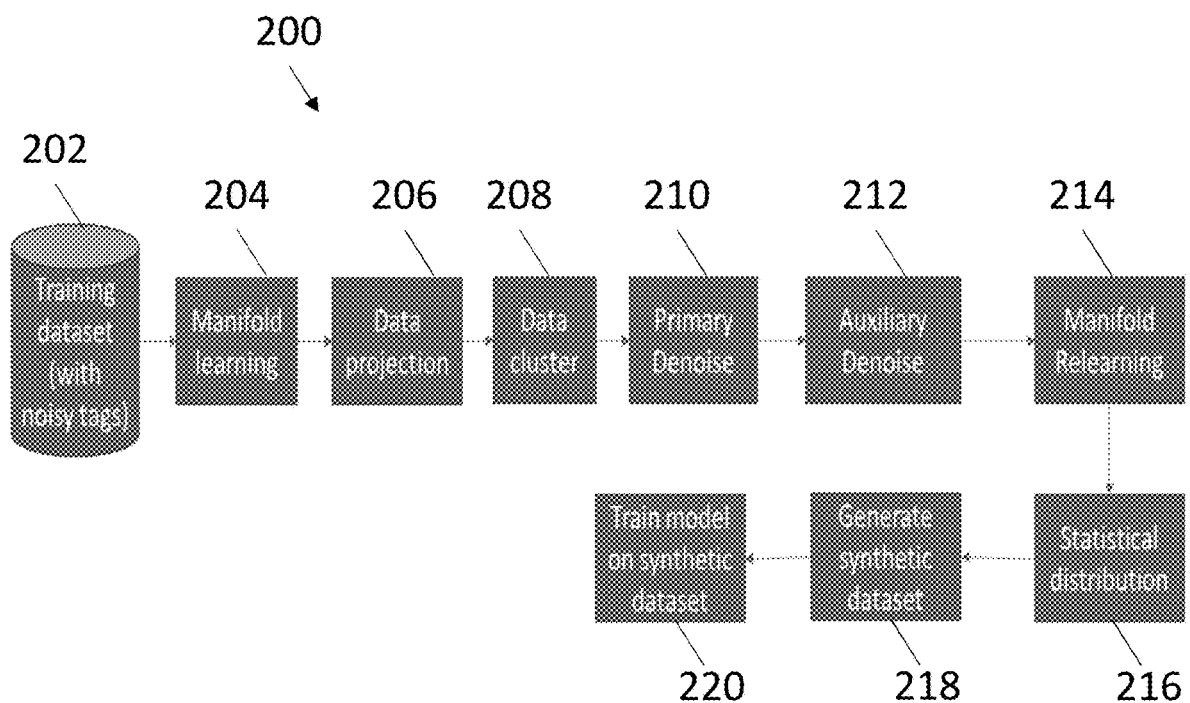
FIG. 2 depicts an example process for generating synthetic data and training a machine learning model, consistent with implementations of the current subject matter.

FIG. 2 depicts an example process 200 for generating synthetic data and training a machine learning model based on the generated synthetic data, consistent with implementations of the current subject matter. At 202, the machine learning engine 110 (e.g., the data generator) may receive the input transaction data from the database 135. The transaction data may define training data for use by the machine learning engine 110 in training the machine learning model 120. As noted herein, the transaction data may include real world and/or historical data. Thus, the transaction data received by the machine learning engine 110 may include bias, noisy tags, and/or non-representative data. During generation of the synthetic data, the machine learning engine 110 may remove the bias, noisy tags, and/or non-representative data, thereby improving the data upon which the machine learning model 120 is trained and improving performance of the machine learning model 120.

In some implementations, the machine learning engine 110 determines whether at least some of the transaction data is erroneous and/or non-representative, and/or whether at least some of the transaction data includes incorrect and/or poor quality tags. Often the raw variables available in a dataset, such as the transaction data, are merely observational data which is generated by the underlying behavior mechanism, which operates on the manifold of the historical training dataset (e.g., the original transaction data). Thus, at 204 (see FIG. 2), the machine learning engine 110 may learn the manifold of the transaction data to determine the transactional behavior patterns in the transaction data, to identify erroneous and/or non-representative data, and/or to identify incorrect or poor quality tags.

Figure 3:
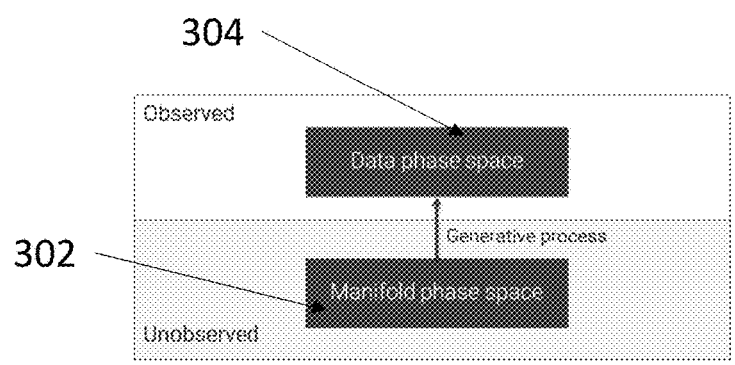
FIG. 3 depicts a schematic representation of the relationship between an unobserved manifold phase space that drives the behavior within an observed data phase space, consistent with implementations of the current subject matter.

FIG. 3 schematically illustrates a generative process that projects the behavior in the unobserved manifold phase space 302 that drives the behavior onto the observed data phase space 304 that is available to the observer in transaction data. Referring to FIG. 3, the machine learning engine 110 may extract the manifold of the transaction data, from which the observational data is generated in the real world. The machine learning engine 110 may additionally and/or alternatively learn the manifold to determine the distribution (e.g., probability distribution) of the transaction data and the tags corresponding to the associated transaction data. While the transaction data may include high dimensional data, the machine learning engine 110 learns the manifold by at least reducing the dimensions of the transaction data, such as by one or more dimension reduction techniques.

At 206, the transaction data may be projected, such as by the machine learning engine 110 into the manifold space, such as to generate a plurality of archetypes for an entity at a particular time or time point, based on the transaction data. The plurality of archetypes may be generated by tokenizing each transaction of the plurality of transactions. Tokenizing each transaction may result in the entities being represented as a bag of tokens, referred to herein as documents. As described herein, a "document" can represent an entity. The documents, including the tokenized transactions, may allow for the machine learning engine 110 to determine transactional behavior patterns and map the transaction data from a high-dimensional space to a low-dimensional space of archetype probabilities. In some implementations, the machine learning engine 110 applies a machine learning model, such as a Bayesian learner, to the documents representing the plurality of tokenized transactions associated with unique entities in the transaction data to generate a set of archetypes (e.g., probability distributions of transactional behavior patterns) over the tokens. Thus, the machine learning engine 110 can associate similar entity types and behaviors learned based on similarities among transactional behaviors, making it ideal in spaces such as anti-money laundering and fraud detection. Further, methods such as collaborative profiling, allow for real-time update of the archetypes as a new transaction is associated with an entity.

Figure 4:
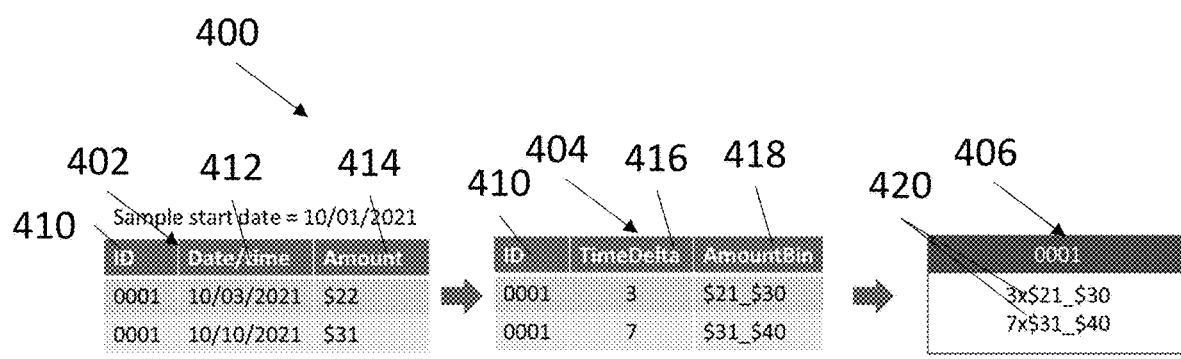
FIG. 4 depicts an example process for tokenizing transactions, consistent with implementations of the current subject matter.

FIG. 4 depicts an example process 400 for tokenizing the plurality of transactions. Referring to FIG. 4, table 402, which may be stored in the database 135, includes the transaction data. The transaction data may include an identifier 410 for a transaction, a time point (e.g., a date and/or time) 412 associated with the transaction, and a dollar amount 414 representing the transaction. For tokenization, the machine learning engine 110 may categorize each data element (e.g., the identifier, the time point, the dollar amount, etc.) of each transaction into various bins. For instance, the machine learning engine 110 may bin the dollar amount 414 into one or more dollar bins 418 defined by a value range. In this example, the bins may include ranges of dollar amounts (e.g., $21 to $30, $31 to $40, etc.). Similarly, the time point 412 of the transaction may be binned according to one or more time bins, such as morning, afternoon, evening, and/or night. Additionally and/or alternatively, the inter-transaction time intervals may be binned into discreet time intervals 416 and can be associated with each transaction as part of the transaction data. Accordingly, each data element associated with each transaction of the plurality of transactions may be binned and/or tokenized. As shown in table 406, the tokenized data elements for each transaction can be joined to form a compound token 420 for each transaction. In such an implementation, each transaction is translated into a single compound token 420.

Based on the plurality of compound tokens 420, the machine learning engine 110 may generate the plurality of archetypes. The plurality of archetypes represent one or more transactional behavior patterns across the plurality of transactions. In some implementations, the machine learning engine 110 generates the plurality of archetypes for each class (e.g., current on line of credit, in default on line of credit, fraud associated with payment card, non-fraud associated with payment card, purchase in marketing application, non-purchase in marketing application, and/or the like). In other words, the machine learning engine 110 may generate separately pluralities of archetypes for each class. This separation allows for the machine learning engine 110 to learn the manifolds for the various classes without synthetic data representation learning being influenced by each unique class dynamics and coverage. Thus, the manifold for each class can be analyzed.

In some implementations, the machine learning engine 110 (e.g., via the data generator) may determine, for each class, a plurality of data points. Each of the plurality of data points represent an archetype probability distribution (e.g., represented as an archetype vector) of a plurality of archetypes for an entity at a time point. The archetype vector represents the archetype probability distribution in the manifold phase space, such as at a particular time point or temporal snapshot.

Figure 5:
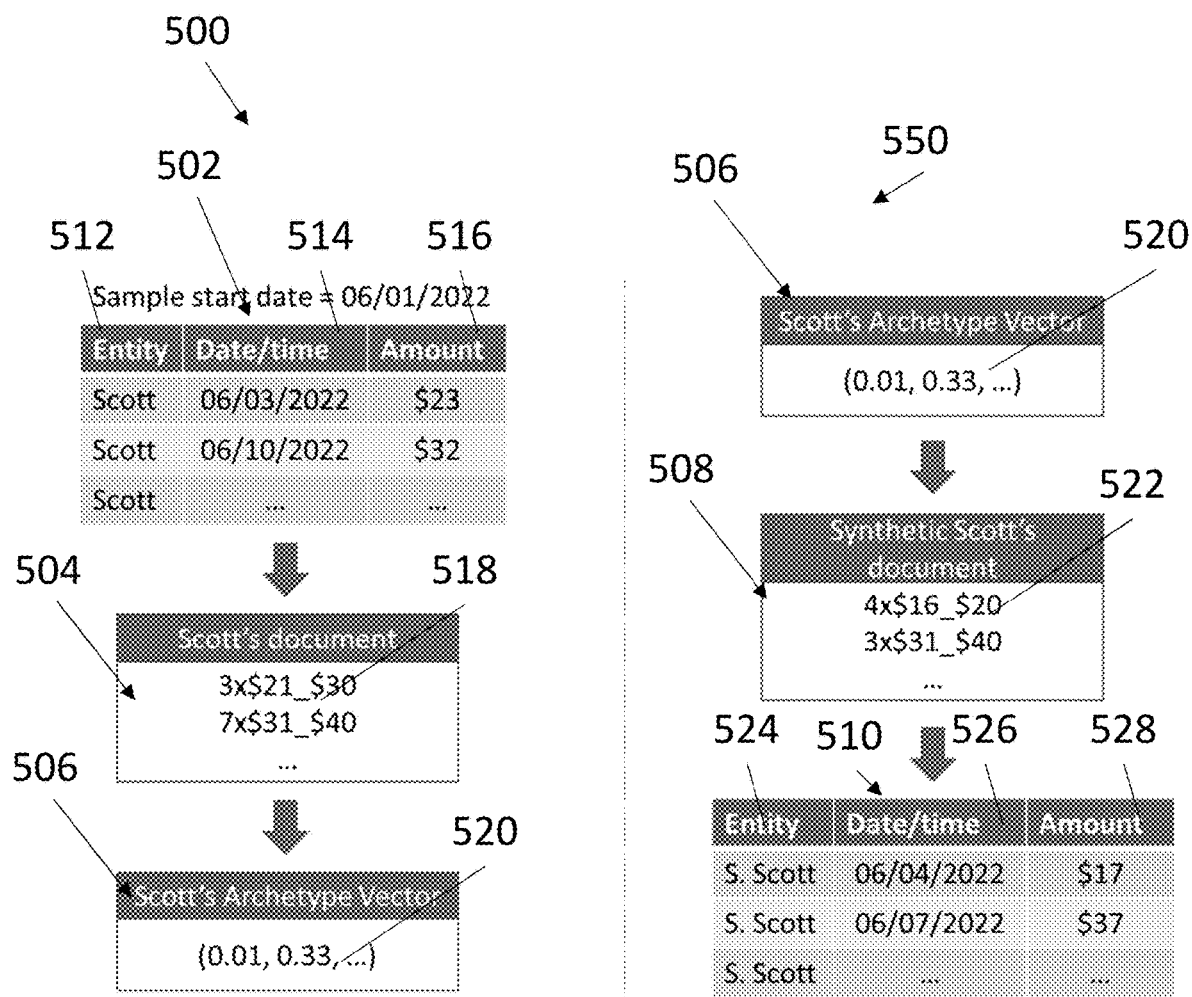
FIG. 5 depicts an example process for generating archetype vectors, consistent with implementations of the current subject matter.

FIG. 5 is an example process 500 for generating the data points, such as the archetype vectors (e.g., the archetype probability distributions), consistent with implementations of the current subject matter. In the process 500, table 502 shows the transaction data including data elements, such as the entity 512, the corresponding time point 514, and the associated dollar amount 516, for each transaction. The table 504 includes the compound tokens 518 generated for each transaction based on the data elements of the transaction data for each transaction. The table 506 includes the archetype vector representation in the archetype phase space generated based on the compound tokens 518. As noted, the archetype vector (e.g., a data point) represents a temporal snapshot of the transactional behavior of a particular entity (in this example—Scott). It should be appreciated that a plurality of archetype vectors can be generated for each entity at various time points to provide representations of the transactional behavior of the entity at various time points.

Again referring to FIG. 5, the process 550 may be implemented by the machine learning engine 110 to generate synthetic data, such as synthetic versions of the entity based on the archetype vector 520. For example, based on the archetype vector 520 in table 506, the machine learning engine 110 may generate a synthetic version of the document 508 for the entity Scott. The synthetic version of the document 508 may include synthetic compound tokens 522 generated based on the probability distributions in the archetype vector 520. The machine learning engine 110 may further generate synthetic transaction data in table 510, including synthetic data elements (e.g., the entity 524, corresponding time point 526, and corresponding dollar amount 528) for each synthetic transaction. The generated synthetic data may be identical in behavior pattern to the transaction data in table 502, since both sets of transaction data have the same archetype vectors.

Figure 6:
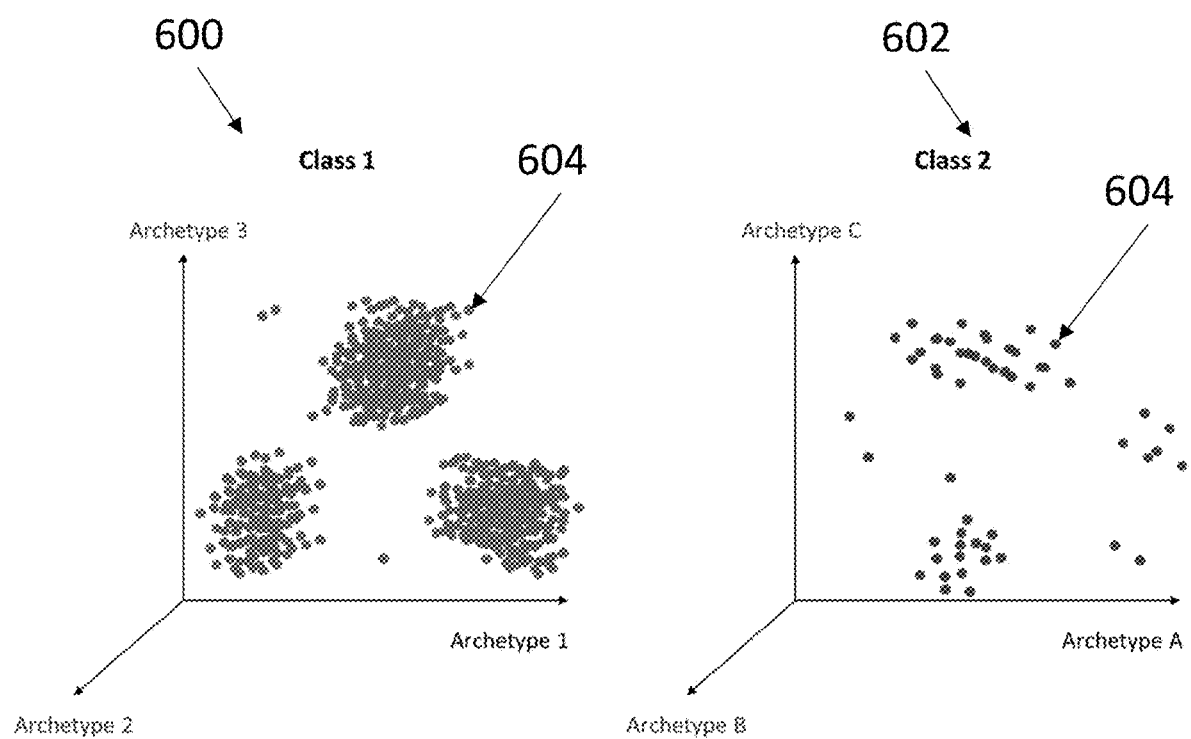
FIG. 6 depicts an example distribution of entities in archetype phase spaces corresponding to different classes of entities, consistent with implementations of the current subject matter.

As noted, a plurality of archetype vectors can be generated for each entity at various time points to provide representations of the transactional behavior of the entity up to those time points. FIG. 6 is a graph 600 and a graph 602, consistent with implementations of the current subject matter, depicting a single snapshot view of all entities represented in the archetype phase space. As shown in the graph 600 and the graph 602, each data point represents a corresponding archetype vector for the same or different entity and at one or more time points.

The graph 600 and the graph 602 correspond to different classes. For example, the data points 604 (e.g., the archetype vectors) associated with the entities belonging to one class are shown in the graph 600, while the data points associated with the entities belonging in a second class are shown in graph 602. It should be appreciated that only three schematic archetypes (e.g., transactional behavior patterns) are shown for each class for ease of visualization. In reality, number of archetypes can be substantially larger and such a graph can have thousands of data points, where each point represents by a single entity or a single snapshot of an entity. For ease of representation, it should also be appreciated that only two classes are shown, though the any number of graphs for any number of classes may be provided.

Figure 7:
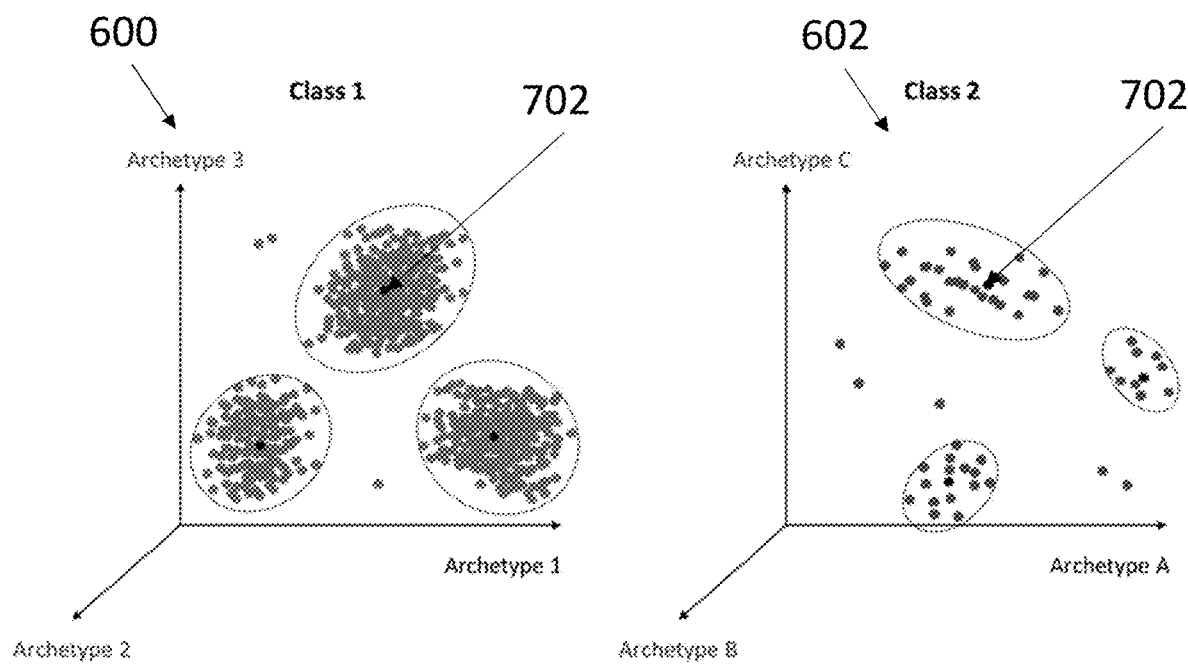
FIG. 7 depicts example clusters, consistent with implementations of the current subject matter.

Referring again to FIG. 2, the machine learning engine 110 (e.g., via the data generator) may cluster the plurality of data points into one or more clusters associated with the one or more transactional behavior patterns. The plurality of data points may be clustered for each class. Clustering the plurality of data points may help identify how the entities relate within their phase space. Each cluster may represent the core set of behaviors for each class. The plurality of data points may be clustered into the one or more clusters by at least applying a clustering technique, such as k-means clustering with elbow method or other clustering techniques. This helps determine an optimal number of clusters in each archetype space. This approach allows for determination of clusters in the archetype phase space of each class and these identified clusters represent the common behavior patterns corresponding to respective classes. FIG. 7 shows graphs 600 and 602 after the data points have been clustered for each class. As shown in FIG. 7, the dominant class (e.g., shown in graph 600) may show better cohesion, whereas the rare class (e.g., shown in graph 602) may show more dispersion.

In some implementations, the machine learning engine 110 may determine a centroid 702 of the one or more clusters. The one or more data points in each cluster may be clustered about the centroid. The centroid 702 is a data point that corresponds to the average of each archetype of the associated entities in the cluster. In other words, the centroid 702 is the data point from which $L_k$ norm distance of all the data points within the corresponding cluster is minimized, whereas their $L_k$ norm distance from all the other cluster centroids are larger. In other implementations, the Euclidian distance (e.g., $L_2$ norm, where k=2) can be employed. While centroids are generally the average of all the corresponding entities in each cluster, the centroid 702 is represented by the nearest data point (e.g., entity) to the average.

The $L_k$ norm ($L_k(x,y)$) distance can be determined using Equation 1, below:

$$\text{distance}(x,y) = L_k(x,y) = [\Sigma_{i=1}^{d}(x_i - y_i)^k]^{1/k} \quad \text{Equation 1}$$

where, d is the dimensionality of the phase space, x and y are two data points or entities in this phase space, and i is used to enumerate various dimensions ranging from 1 to d.

For k=2, the $L_k$ norm transforms to the Euclidian distance, as follows:

$$\text{distance}(x,y) = L_2(x,y) = \sqrt{\Sigma_{i=1}^{d}(x_i - y_i)^2} \quad \text{Equation 2}$$

where, d is the dimensionality of the phase space, x and y are two data points or entities in this phase space, and i is used to enumerate various dimensions ranging from 1 to d.

Archetype phase space generation acts as a dimensionality reduction given that most data sets are over-specified in the dimensionality of the data given that the manifold structure is latent, yet this phase space is large enough that Euclidian distance may not perform well as a distance metric. To allow for the complex non-linear nature of this phase space and associated sparsity that is often the case in such high dimensional spaces, the $L_1$ norm may be used as the distance metric for determining clusters. This distance metric is given by the following equation:

$$\text{distance}(x,y) = L_1(x,y) = \Sigma_{i=1}^{d}(x_i - y_i) \quad \text{Equation 3}$$

where, d is the dimensionality of the phase space, x and y are two data points or entities in this phase space, and i is used to enumerate various dimensions ranging from 1 to d.

Referring again to FIG. 2, at 210, the machine learning engine 110 (e.g., via the data generator) may perform primary denoising. For example, the machine learning engine 110 may remove one or more non-representative data points from the plurality of data points to define a reduced set of the plurality of data points. By denoising data points (e.g., removing data points) that are not in the identified clusters of dominant transactional behavior patterns for each of the archetype phase spaces corresponding to the various classes, the impact of bias, low quality transaction data, and/or inaccurate tags in the input transaction data can be limited.

For a given class, the assignment of each data point to a corresponding cluster centroid and the distance from the centroid are analyzed. For example, at least some of the data points may not belong to any cluster, as the data points are too far from all of the cluster centroids (e.g., centroids 702), though mathematically each data point would be assigned a cluster by the clustering algorithm. The distance and density of entities associated with each centroid provides a measure of consistency of transactional behavior patterns. These sparse or non-representative data points often generate noise and lack of fidelity in real-world models. Thus, the machine learning engine 110 beneficially may remove such data points in generating a reduced set of data points.

The machine learning engine 110 may remove the one or more non-representative data points based at least on a metric associated with the one or more non-representative data points failing to meet a threshold metric. The machine learning engine 110 may determine the threshold metric and compare the value of the metric for a given data point to the threshold metric. The threshold metric may include a metric of belonging, and/or the like.

For example, the machine learning engine 110 may use the previously determined $L_1$ norm to determine a distance of each data point from the centroid of one or more corresponding clusters. This allows for better capturing of the density behavior associated with high dimensional phase spaces, even when a robust dimensionality reduction technique such as archetype phase space generation has been applied. The machine learning engine 110 may use the $L_1$ norm to generate the metric of belonging. In this example, the machine learning engine 110 may remove the one or more non-representative data points based at least on the metric of belonging, generated based on the $L_1$ norm, associated with the one or more non-representative data points failing to meet a threshold metric of belonging.

Additionally and/or alternatively, the threshold metric may be a peak distance and/or a metric of belonging (e.g., a peak distribution density of the plurality of data points associated with a corresponding cluster of the one or more clusters). For example, the machine learning engine 110 may apply principal component analysis on each of the clusters to project the data point on the principal eigenvector to determine a Euclidian distance. The machine learning engine 110 may generate the metric of belonging or peak distance based on the Euclidian distance generated based on the principal component analysis. This allows for the machine learning engine 110 to determine the principal eigenvectors (or principal components) of each cluster in terms of the corresponding archetypes. The distance from the centroid of the corresponding cluster to any data point in this phase space is then computed along the principal components. This approach allows for considering the density distribution of the cluster while computing the distance from the centroid to any data point in the archetype phase space. The principal components of each cluster would be different accounting for their own density distributions.

In some implementations, the threshold metric (e.g., the metric of belonging) is 0. If the generated metric for a corresponding data point is zero, the data point can be removed to denoise the clusters.

Figure 9:
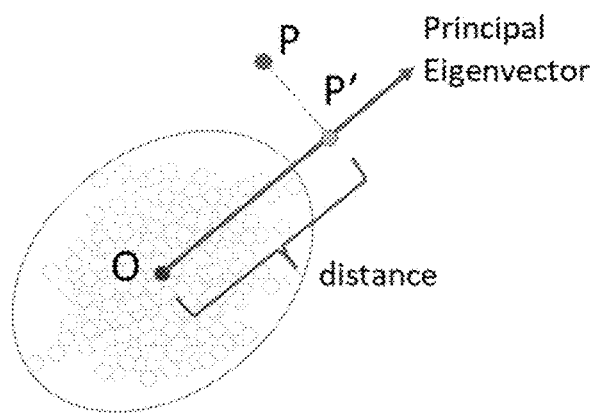
FIG. 9 depicts an example schematic of using a single principal component to determine a distance of a data point from a centroid, consistent with implementations of the current subject matter.

FIG. 9 depicts an example schematic of using a single principal component to determine the distance of a data point from the centroid, consistent with implementations of the current subject matter. As shown in FIG. 9, principal eigenvectors are centered around the corresponding cluster centroid, O. Then the entity, P, is projected onto the principal eigenvectors as projected point P'. The distance of the projected point, P', to the centroid, O, is computed, using a Euclidian measure.

Figure 10:
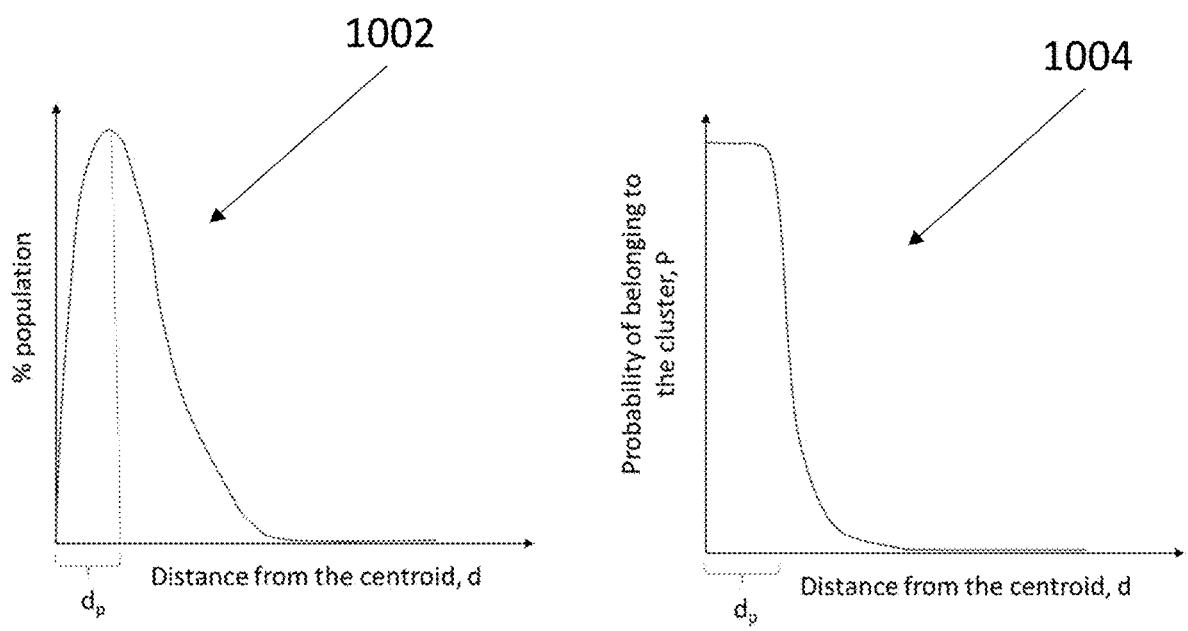
FIG. 10 depicts an example distribution of distances of data points in a single cluster from a cluster centroid and a corresponding probability of belonging to the cluster, consistent with implementations of the current subject matter.

FIG. 10 schematically depicts a graph 1002 and a graph 1004, consistent with implementations of the current subject matter. The graph 1002 shows a distribution of the distances of data points in a single cluster from the cluster centroid. In other words, the graph 1002 shows the population distribution of entities based on their distances from cluster centroid of a single cluster, k, in the archetype phase space of class, c. The graph 1004 shows a probability of the data points belonging to the cluster and the distance of the data points in the single cluster. In other words, the graph 1004 shows the probability, P, of the entities belonging to the class as a function of the distance from the cluster centroid. As shown in the graphs 1002, 1004, most of the data points are generally within a narrow radius (e.g., a short distance) from the cluster centroids. Even if a data point is not within a reasonable distance from the centroid of a cluster (e.g., the distance fails to meet the threshold metric), the data point may still be assigned to the cluster because the data point is even farther from other cluster centroids. These machine learning engine 110 determines that such points represent noisy or erroneous data points that do not represent usual behavior of the entities within that class of entities. Accordingly, the machine learning engine 110 removes such points during primary denoising.

As noted above, the machine learning engine 110 may generate the threshold metric as the peak distance and/or the metric of belonging. The peak distance $d_p$ is the distance from the cluster centroid at which there is maximum concentration of the data points in the corresponding cluster. This distance represents the density of the distribution of data points in the cluster. The metric of belonging, $P_k^c(x)$, can be determined using the following equation:

$$P_k^c(x) = \frac{1}{1 + e^{\gamma * f(x)}} \qquad \text{Equation 4}$$

where P is correlated with the probability of an entity, x, belonging to any cluster, k, for any class, c, and where $$f(x) = \frac{d_k^c}{dp} - 1 \text{ and } d_k^c = \text{distance}(x, O_k^c),$$

where $\gamma \geq 1$ represents cluster cohesion of cluster k in class c, $O_k^c$ is it's centroid and the distance (e.g., computed using $L_1$ norm and/or single principal compartmental analysis), $d_k^c$, between x and $O_k^c$ is computed using the $L_1$ norm and/or the by applying principal component analysis. The metric of belonging may represent, for a given data point, x, correlation with the probability of belonging to a cluster, k, in an archetype phase space of class, c. In some implementations, if $P_k^c(x) \approx 0$ for all the clusters, k, in the data point's given class, c, then the data point x is noisy or erroneous, and is not representative of any of the behavior patterns for the entities belonging to class c. In other words, the data point x had a metric (e.g., the metric of belonging value) that failed to meet the threshold metric of belonging value. Thus, the machine learning engine 110 may remove the data point x to define a reduced set of the data points.

Figure 8:
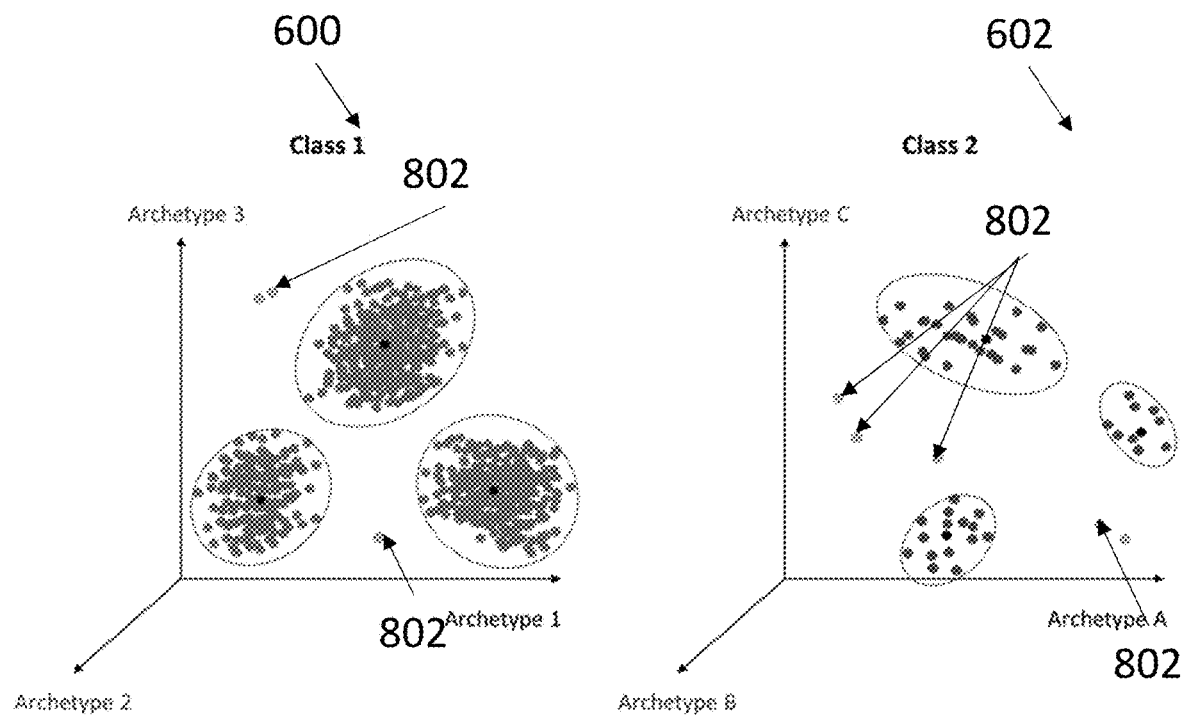
FIG. 8 depicts example clusters after denoising, consistent with implementations of the current subject matter.

FIG. 8 shows the clusters in graphs 600 and 602 after removal of the non-representative data points from the corresponding classes. For example, in FIG. 8, the grayed data points 802 represent the non-representative data points having a metric that failed to meet the threshold metric. Thus, the machine learning engine 110 removed those data points from the plurality of data points to generate a reduced set of the plurality of data points.

In some implementations, the data points remaining in each class may be re-clustered. For example, the machine learning engine 110 may re-cluster the reduced set of the plurality of data points into one or more updated clusters associated with the one or more transactional behavior patterns. The machine learning engine 110 may re-cluster the reduced set of the plurality of data points for each class and after removing the one or more non-representative data points. This may reduce or eliminate the effect of the removed data points on the cluster centroids. While in most cases, this doesn't change the centroids for each cluster, the machine learning engine 110 may define a centroid and a radius based at least on the threshold metric for each of the one or more re-clustered clusters.

Figure 11:
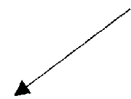
FIG. 11 depicts an example representation of a cluster assignment of each entity and distance from a corresponding centroid, consistent with implementations of the current subject matter.

FIG. 11 depicts a schematic representation 1100 of the cluster assignment of each entity and distance from the corresponding centroid in each cluster for each entity after the machine learning engine 110 applies primary denoising. The representation 1100 shows that each entity belongs to a single class, and a single cluster within that class. Note that none of the entities have metric of belonging, $P_k^c(x) \approx 0$.

Figure 12:
FIG. 12 depicts an example representation of a distance of belonging for each data point, consistent with implementations of the current subject matter.

In some implementations, a distance of belonging may be used at the time of synthetic data generation to control the generation of data points, ensuring that no generated data point is farther than the distance of belonging, $r_k^c m$ from the corresponding cluster centroid. The distance of belonging, $r_k^c$, of a cluster k in the phase space of class c may be determined as the smallest distance from the centroid of cluster k at which $P_k^c(x)$ converges to 0 for an entity, x. In other words, the distance of belonging may be determined using the following equation:

$$r_k^c = \text{Argmin}_d(P_k^c(x) \approx 0) \qquad \text{Equation 5}$$

where $P_k^c(x)$ is defined using Equation 4, above. FIG. 12 shows a schematic representation 1200, consistent with implementations of the current subject matter, of the distance of belonging for each data point. Using the distance of belonging at the time of synthetic data generation incorporates the effect of the primary denoising.

Referring back to FIG. 2, at 212, the machine learning engine 110 applies auxiliary denoising to detect and eliminate noise that arises due to errors in the tagging process. In applying the auxiliary denoising, the machine learning engine 110 removes the one or more non-representative data points based on the one or more non-representative data points being associated with at least two classes. This helps to remove data points that may have been incorrectly tagged.

As an example, a dominant class may represent a positive outcome (e.g., genuine money transfer), and a rare class may represent a negative outcome (e.g., money laundering). Due at least in part to defensive tagging, certain data points, such as genuine money transactions that are borderline unusual, may be tagged as potential money laundering. These defensive filing cases may show a high density of transactions that are in two different defined clusters for two different classes. This may allow for the machine learning engine 110 to remove data points belonging (or having a high probability of belonging) to multiple classes.

To determine which data points were incorrectly tagged and/or have a high probability of belonging to multiple classes, the machine learning engine 110 may determine whether an entity, x, belonging to one class, $c_1$, has a high enough metric of belonging for a cluster in another class, $c_2$. For example, the machine learning engine 110 identifies all entities, x, such that the metric of belonging $P_{k1}^{c1}(x) \approx 0$ and $P_{k2}^{c2}(x) \approx 0$. In other words, the machine learning engine 110 identifies all entities having non-zero metrics of belonging for multiple classes. Entities having non-zero metrics of belonging for multiple classes have high probabilities of being a member of both classes. This represents a possible instance of mislabeling of the class. As a result, the machine learning engine 110 may remove such data points from the dataset to generate the reduced set of data points.

Figure 13:
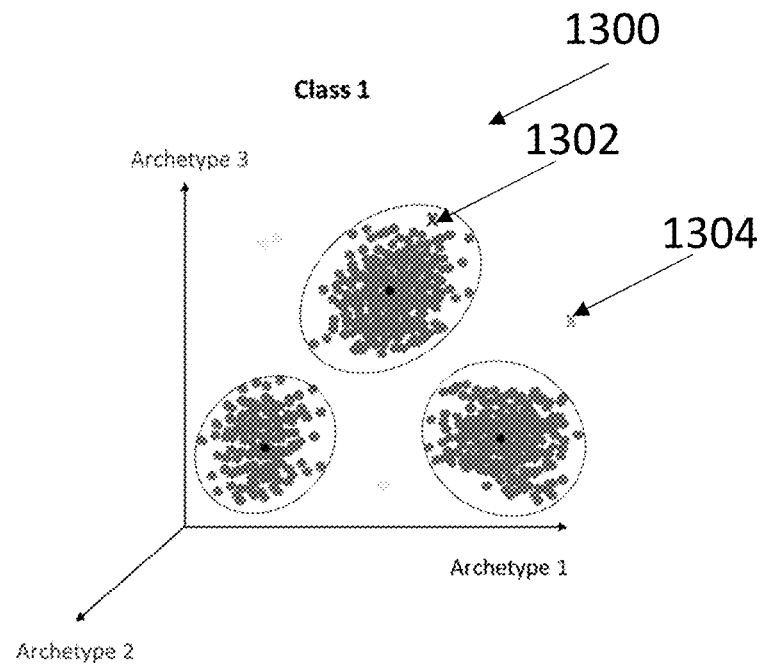
FIG. 13 depicts an example of two entities from one class projected onto the phase space of another class, consistent with implementations of the current subject matter.

FIG. 13 depicts a graph 1300 (based on the graph 602), consistent with implementations of the current subject matter, showing two data points labeled as class 2 (represented with X's in the graph 1300), in the archetype phase space of class 1. Since the data point 1302 belongs to a cluster in class 1 as well, the data point 1302 is removed from the plurality of data points (e.g., the input dataset). On the other hand, the data point 1304 does not belong to any cluster in class 2. Hence this data point is not removed from the plurality of data points.

Referring again to FIG. 2, at 214, the machine learning engine 110 re-learns the manifold based on the reduced set of the plurality of data points, such as after the denoising (e.g., primary denoising and/or the auxiliary denoising). To relearn the manifold, the machine learning engine 110 may generate updated archetypes for each class based on the remaining data points.

Figure 14:
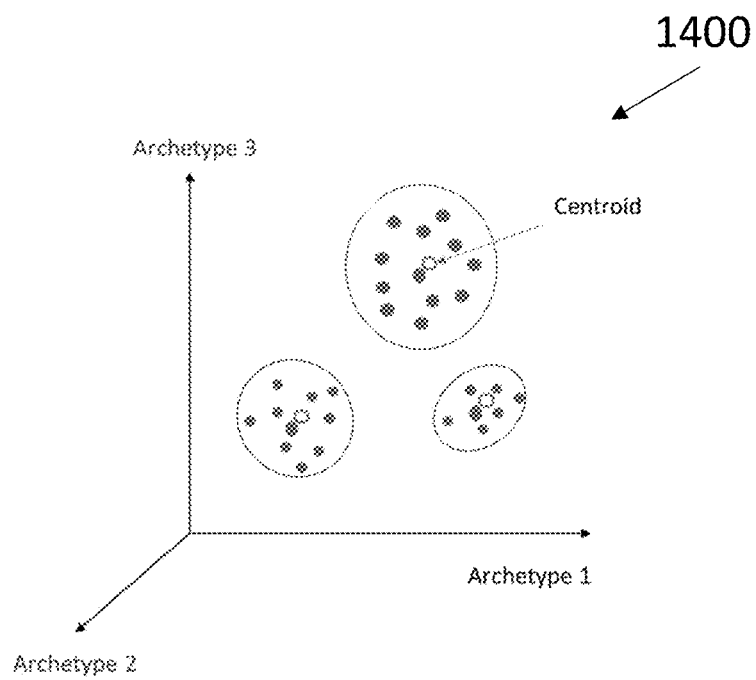
FIG. 14 depicts an example of centroids of each cluster, consistent with implementations of the current subject matter.

The machine learning engine 110 may generate an updated archetype probability distribution (e.g., updated archetype vectors) based at least on the reduced set of the plurality of data points for each of the classes. This represents an updated phase space for each of the classes. In the updated phase space for each of the classes, the data points may be re-clustered. As shown in the graph 1400 of FIG. 14, the machine learning engine 110 may update the centroids for these re-clustered clusters based on the reduced set of the plurality of data points.

Again referring to FIG. 2, at 216, the machine learning engine generates an updated archetype probability distribution (e.g., a statistical distribution) based at least on the reduced set of the plurality of data points. The updated archetype probability distribution may be represented as a synthetic archetype vector. The updated archetype probability distribution may be generated by at least leveraging the updated centroid, the updated radius, and/or the updated threshold metric for each of the re-clustered clusters. The machine learning engine 110 may generate summary statistics for each of the re-clustered clusters based on the reduced set of the plurality of data points and/or the updated archetype probability distribution.

Figure 15:
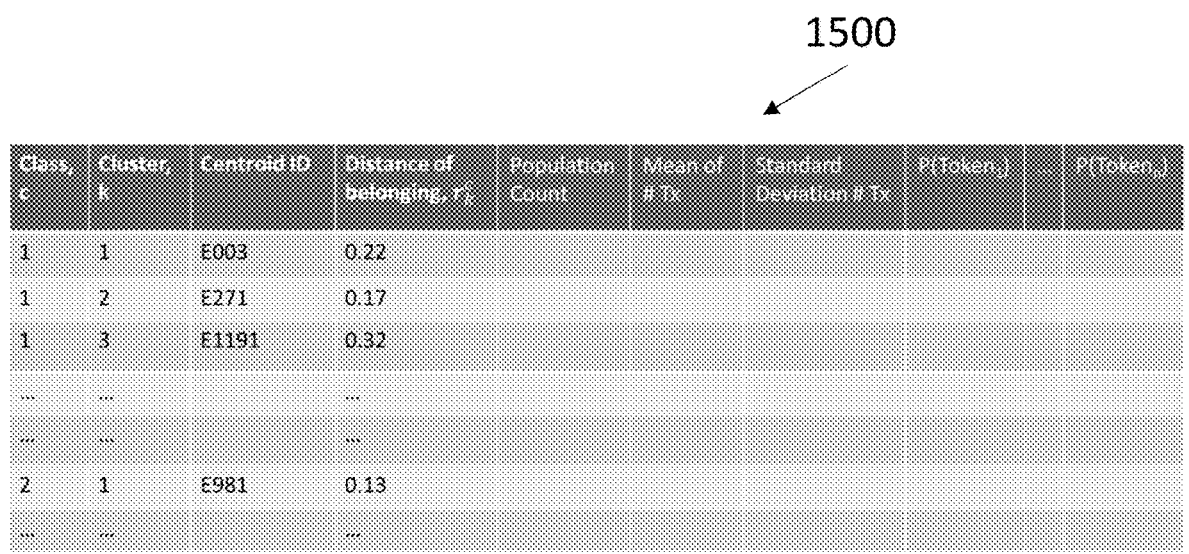
FIG. 15 depicts an example representation showing summary statistics of all identified clusters across all classes, consistent with implementations of the current subject matter.

FIG. 15 depicts a schematic representation 1500, consistent with implementations of the current subject matter, showing the probability distribution of the clusters over all the tokens for all the classes and their cluster centroids and the generated summary statistics based on the reduced set of the plurality of data points. As shown in FIG. 15, the distance of belonging and population count represent the probability density of the re-clustered clusters. Additionally and/or alternatively, the metric of belonging may be applied instead of distance of belonging. Additionally and/or alternatively, the machine learning engine 110 may determine the mean and standard deviation over the number of transactions per entity in each of the clusters.

The machine learning engine 110 may use the probability distribution of the cluster centroids over all the tokens and/or the generated summary statistics (e.g., see FIG. 15) to generate the synthetic data. For example, referring back to FIG. 2, at 218, the machine learning engine 110 generates the synthetic data. The machine learning engine 110 may select representative transaction data based on the updated archetype probability distribution. The representative transaction data may define the synthetic data. The representative transaction data corresponds to a statistical distribution of transactions associated with each archetype of the plurality of archetypes. Employing the updated archetype probability distribution and/or summary statistics helps to ensure the resultant synthetic data has realistic properties and has the underlying manifolds.

Figure 16:
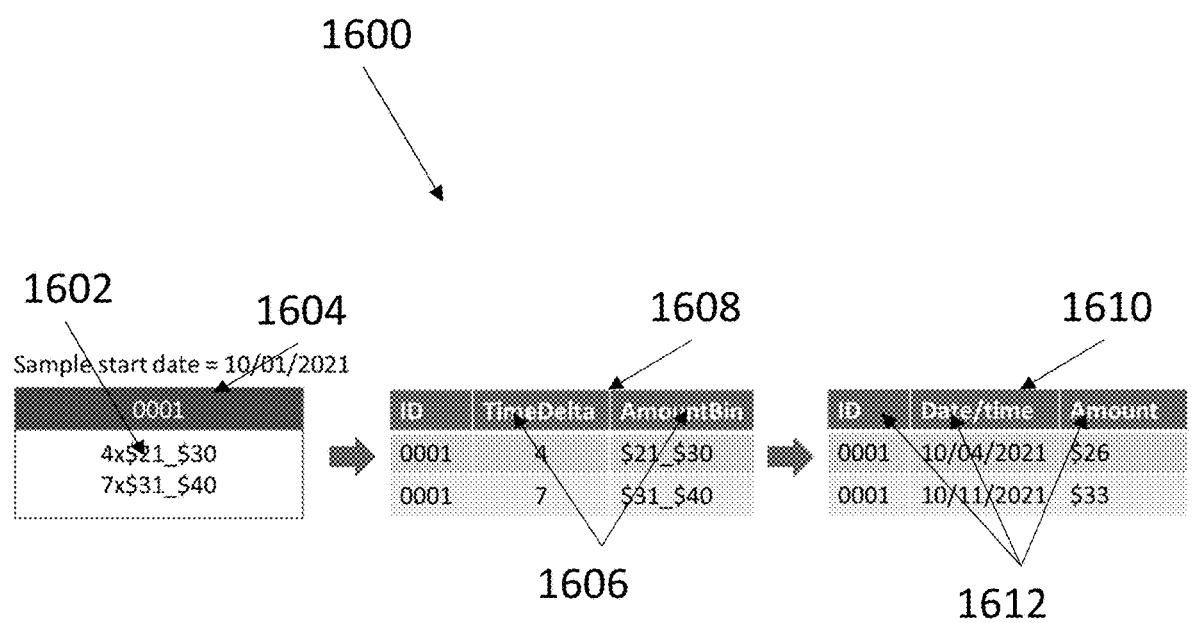
FIG. 16 depicts an example process for generating synthetic data, consistent with implementations of the current subject matter.

The machine learning engine 110 may generate the synthetic data by at least generating a specified quantity of data points (e.g., identifiers) per cluster, as determined by the column "Population Count" in representation 1500 of FIG. 15. The machine learning engine 110 may generate a sequence of tokens based on the probability distribution of the corresponding centroid of the re-clustered clusters. Since each token represents a complete transaction, each synthetically generated token can then be translated back to generate a synthetic transaction as shown in FIG. 16. For the bins representing ranges, one of the values within the range is taken with equal probability as the recovered value. The statistics around the mean and standard deviation of the number of transactions for the entities in the cluster ensure that a reasonable number of transactions for each of the simulated entity are generated.

For example, as shown in the process 1600 in FIG. 16, consistent with implementations of the current subject matter, the machine learning engine 110 may generate synthetic compound tokens 1602, in table 1604, based on the updated archetype probability distribution and/or summary statistics, as described herein. The machine learning engine 110 may translate the synthetic compound tokens 1602 to bins 1606 (e.g., inter-transaction time interval bins, time delta bins, dollar amount bins, and/or the like), in table 1608, for each transaction. In some implementations, the time delta bin may determine a gap in time (e.g., days, hours, etc.) between a previously generated synthetic transaction for the corresponding entity and a new synthetic transaction generated for the entity associated with the corresponding token. If the token is the first synthetic token for an entity, the time delta bin defines a quantity of days from a specified sample start date. The machine learning engine 110 may generate the synthetic transaction data in table 1610, including data elements 1612 (e.g., an identifier, time point, dollar amount, and/or the like) for each synthetic transaction, based on the synthetic binned data. The process 1600 may be the same as or similar to the process 550. For example, the process 1600 and the process 550 may include one or more interchangeable steps and may include one or more of the same or similar steps.

Referring again to FIG. 2, the machine learning engine 110 may train the machine learning model 120 based on the generated synthetic data. The machine learning model 120 may include a neural network model, and/or the like. The machine learning model 120 may include a logistic regression model, a scorecard model, a neural network model, support vector machines, decision trees, random forest and gradient boosted decision trees, and/or the like. The specific machine learning model 120 may be determined by variety of factors, such as regulatory, transparency, explainability, bias remediation, monotonicity, predictive power requirements, and/or the like. The machine learning engine 110 may train the machine learning model to detect fraud, detect money laundering, determine credit risk, and/or the like.

Figure 17:
FIG. 17 depicts a flowchart illustrating an example of a process for generating synthetic data and training a machine learning model, consistent with implementations of the current subject matter.

FIG. 17 depicts a flowchart illustrating a process 1700 for generating synthetic data and training a machine learning model based on the generated synthetic data. Referring to FIGS. 1-16, one or more aspects of the process 1700 may be performed by the data generation system 100, the machine learning engine 110, other components therein, and/or the like.

At 1702, the machine learning engine 110 may generate synthetic data based on input data. The input data may include a plurality of transactions and a class assigned to each of the plurality of transactions. The input data may additionally and/or alternatively include an entity associated with each transaction of the plurality of transactions. The input data may additionally and/or alternatively include a time point associated with the time at which the corresponding transaction of the plurality of transactions was performed. For example, a first transaction of the plurality of transactions may be associated with a class, an entity, and a time point, a second transaction of the plurality of transactions may be associated with the same or different class as the first transaction, the same or different entity as the first transaction, and another time point, and so on.

Referring to FIG. 18, the machine learning engine 110 may generate the synthetic data using process 1800. At 1802, the machine learning engine 110 (e.g., via the data generator) may determine, for each class, a plurality of data points. Each of the plurality of data points represent an archetype probability distribution (e.g., represented as an archetype vector) of a plurality of archetypes for an entity at a time point. The plurality of archetypes represent one or more transactional behavior patterns across the plurality of transactions. The plurality of archetypes may be generated by tokenizing each transaction of the plurality of transactions. Additionally and/or alternatively, the plurality of archetypes may be generated by applying a machine learning model (e.g., a second machine learning model) to a plurality of documents representing the plurality of tokenized transactions associated with unique entities in the transaction data.

At 1804, the machine learning engine 110 (e.g., via the data generator) may cluster the plurality of data points into one or more clusters associated with the one or more transactional behavior patterns. The plurality of data points may be clustered for each class. The plurality of data points may be clustered into the one or more clusters by at least applying a clustering technique. The clustering technique includes k-means clustering with elbow method or other clustering techniques. The clustering may include determining a centroid of the one or more clusters. The one or more data points in each cluster may be clustered about the centroid.

At 1806, the machine learning engine 110 (e.g., via the data generator) may remove one or more non-representative data points from the plurality of data points to define a reduced set of the plurality of data points. The machine learning engine 110 may remove the one or more non-representative data points based at least on a metric associated with the one or more non-representative data points failing to meet a threshold metric. The threshold metric may represent a peak distribution density of the plurality of data points associated with a corresponding cluster of the one or more clusters. The threshold metric may include a peak distance, a metric of belonging, or the like, corresponding to the cluster as described herein.

The machine learning engine 110 may generate the threshold metric. The machine learning engine 110 may compare the generated metric with the threshold metric. The machine learning engine 110 may determine the data point belongs in the cluster when the generated metric meets the threshold metric. The machine learning engine 110 may determine the data point is a non-representative data point and should be removed when the metric fails to meet the threshold metric. This helps to de-noise the data points by removing data points that do not represent the primary transactional behavior patterns, since such data points may represent poorly captured data and/or biased data. Additionally and/or alternatively, the machine learning engine 110 may remove the one or more non-representative data points based on the one or more non-representative data points being associated with at least two classes. This helps to remove data points that may have been incorrectly tagged.

In some implementations, the data points remaining in each class may be re-clustered. For example, the machine learning engine 110 may re-cluster the reduced set of the plurality of data points into one or more updated clusters associated with the one or more transactional behavior patterns. The machine learning engine 110 may re-cluster the reduced set of the plurality of data points for each class and after removing the one or more non-representative data points. In some implementations, the machine learning engine defines a centroid and a radius based at least on the threshold metric for each of the one or more re-clustered clusters.

At 1808, the machine learning engine 110 (e.g., via the data generator) may generate an updated archetype probability distribution based at least on the reduced set of the plurality of data points. The updated archetype probability distribution may be represented as a synthetic archetype vector. The updated archetype probability distribution may be generated by at least leveraging the centroid, the radius, and/or the threshold metric. Additionally and/or alternatively, the machine learning engine 110 may generate summary statistics based on the reduced set of the plurality of data points and/or the updated archetype probability distribution.

At 1810, the machine learning engine 110 (e.g., via the data generator) may select representative transaction data based on the updated archetype probability distribution. The representative transaction data may define the synthetic data. The representative transaction data corresponds to a statistical distribution of transactions associated with each archetype of the plurality of archetypes. The representative transaction data may be additionally and/or alternatively generated by applying the summary statistics to a simulated set of transactions corresponding to one or more simulated entities. In some implementations, the generated summary statistics are used to generate the synthetic transactions and/or data points.

Referring again to FIG. 17, at 1704, the machine learning engine 110 may train the machine learning model (e.g., the machine learning model 120) based on the generated synthetic data. The machine learning model 120 may include a neural network model, and/or the like.

EXAMPLE EXPERIMENTS

In example experiments, a machine learning model trained on real world data was compared with a machine learning model (e.g., the machine learning model 120) trained on the synthetic data generated by the machine learning engine 110, consistent with implementations of the current subject matter. In the example experiments, the input "pure" transaction data included a historical sample of home equity line of credit data ("HELOC") with known outcomes of whether the customer had defaulted on monthly payments. The known outcomes were used to derive binary positive and negative outcomes. The transaction data was tagged to indicate whether the customer had defaulted on monthly payments and used as a baseline reference. A subset from the transaction data was sampled for model training and testing purposes, and the remained transaction data was used as a validation data subset for validation purposes. The training and testing datasets were combined to add noise. Note that the validation data subset was exclusively used for performance evaluation.

Two sets of experiments were conducted. In a first set of experiments, noise was added to the transaction data by generating synthetic records with multiple data elements having non-representative values. First, records were generated using the distributions from the original dataset and then certain data elements of each record were selected. The values of the selected data elements were replaced with non-representative values from the distribution. For instance, it can be rare for accounts to have more than 20 trade lines with balance but almost never above 30. Thus, for some generated records, the value of this field was set between 20 and 30.

In the second set of experiments, noise in the tags was simulated by generating representative synthetic records based on the distributions seen in the original dataset. The tags in this dataset were set to simulate noisy tags. For example, if the case was initially generated based on the distribution of the "not in default" class, that record was tagged as "in default" and vice versa. As a result, new datasets ("noisy datasets") containing noisy records and tags were created.

Figure 19:
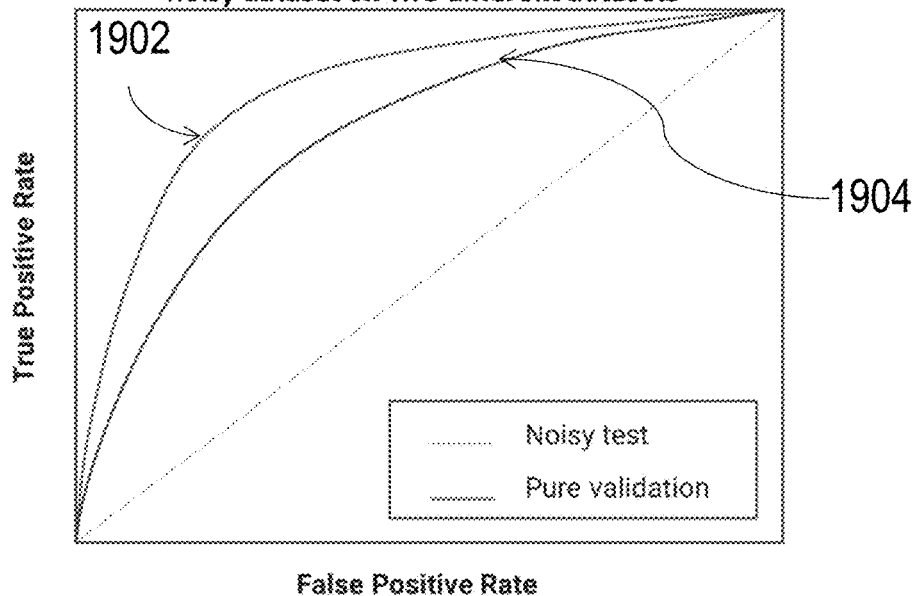
FIG. 19 depicts an example performance evaluation graph depicting misleading performance superiority of a model trained using a noisy dataset on a noisy test dataset in comparison with a pure validation dataset, consistent with implementations of the current subject matter.

A neural network model was trained using a subset (a "training dataset") of the noisy data from each noisy dataset. The performance of each neural network model was evaluated based on the remainder of the subset (the "testing dataset"). This simulates real world modeling projects where only the noisy dataset is available. The model's performance was evaluated based on the reference validation dataset to understand the performance of the model on real life outcomes in production. FIG. 19 is a schematic representation 1900 of the performance of a decision model trained on the HELOC dataset using simulated noise. As shown in FIG. 19, the performance (e.g., shown as line 1902) of the machine learning model trained on the noisy training dataset looked respectable on the noisy test dataset, but the same model's performance (e.g., shown as line 1904) looked poorer when tested on the "pure" validation dataset. This is not unexpected as the noisy records and tags introduce uncertainty in the models and weaken the decision boundary learned by the model, thus dropping the performance on the actual outcomes in production.

This indicates that in the absence of "pure" validation data during actual modeling projects where only noisy datasets are available leads to a misrepresentation of actual model performance. Poor data quality and the impact of models built on this noisy data doesn't become evident until after being in production use for some time and often measured in terms of real losses to a business stemming from incorrect treatments. It is far more desirable to build denoised data (e.g., the generated synthetic data consistent with implementations of the current subject matter) and use the generated denoised data (e.g., the generated synthetic data consistent with implementations of the current subject matter) to train the machine learning model. This allows for the areas of less certainty due to do inconsistency in tagging or noise to be known.

Having established the detrimental effect of noise and uncertainty in the tags, the data generation system 100 consistent with implementations of the current subject matter was employed to generate the synthetic data (e.g., the denoised data). The data generation system 100 determined the archetypes representing the manifolds for each of the two classes and projected the two classes of data points on corresponding manifold phase spaces. The data generation system 100 clustered the data points to generate clusters of data points in each of the manifold phase spaces. Subsequently, the data generation system 100 applied the primary denoising on the dataset for each of the two classes. Among the first set of experiments, the denoising process identified 68% of noisy records and removed the noisy records. In this case, there were 13% pure records that were removed as well. Among the second set of experiments, the denoising process identified 54% of the records with noisy tags, and removed those records. The data generation system 100 also removed about 15% of records with pure tags as noisy. Removal of genuine records is often not of concern give that genuine and well represented data consists of large densities of transactions and some removal in the denoising process often does not impact genuine representation in the modeling dataset.

Figure 20:
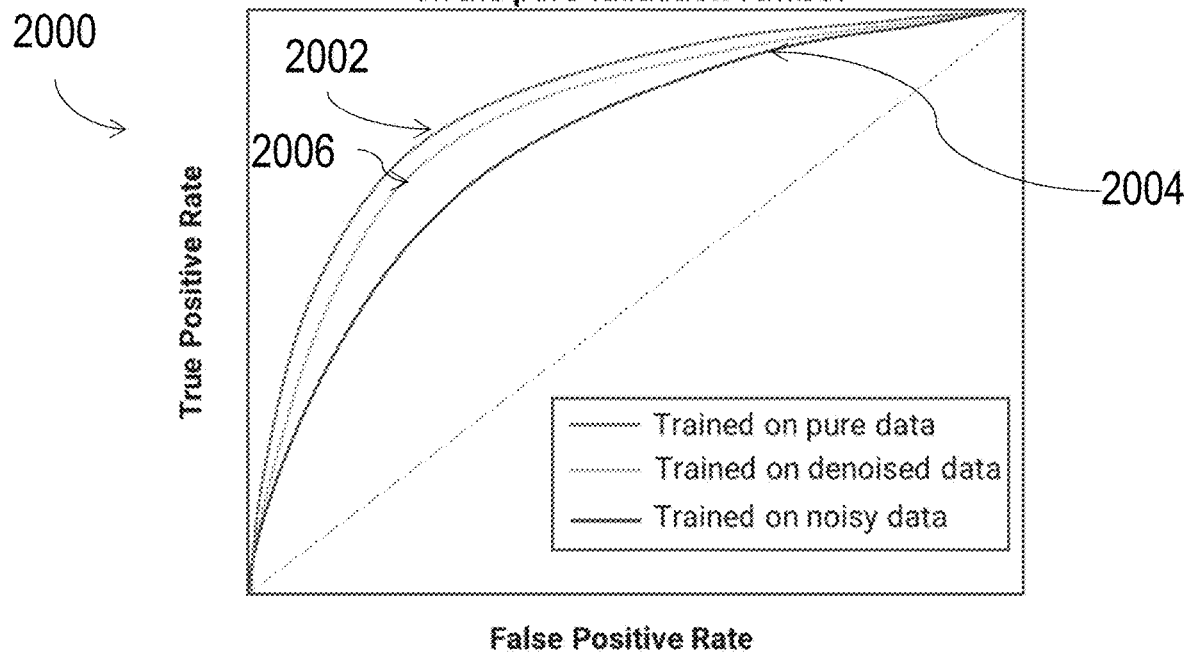
FIG. 20 depicts an example performance evaluation graph, depicting the true performance superiority of a model trained using a generated synthetic dataset over a model trained using a noisy dataset on a pure validation dataset, consistent with implementations of the current subject matter.

After the denoising, the data generation system 100 learned the denoised manifold and corresponding statistical distribution of the new clusters in the updated manifold for each class. Subsequently, the data generation system 100 generated a synthetic dataset using the statistics of each of the cluster in each of the class manifold. Using this synthetic dataset, the data generation system 100 trained a new model, and carried out performance analysis of this model on the pure validation dataset. The schematic representation of the performance of this model (shown as line 2002 in FIG. 20), along with the performance of the original noisy model (shown as line 2004 in FIG. 20) on the same validation dataset is shown in FIG. 20. This shows that the resultant model (e.g., the machine learning model 120) trained on the denoised synthetic dataset (shown as line 2006 in FIG. 20) performs better on the pure validation dataset compared to the original model that was trained using noisy tags. This also shows that this model performs reasonably close to the model trained on pure dataset. Since a pure dataset is not available in real life, and only noisy dataset is available, the synthetic data generation described herein leads to better performing models.

For instance, in one experiment, the machine learning model trained on noisy dataset had an area under curve-receiver operating characteristic curve ("AUC-ROC") of 0.76, the model trained on the pure dataset had an AUC-ROC of 0.80, and the model (e.g., the machine learning model 120) trained on the denoised synthetic dataset (e.g., the synthetic data generated by the data generation system 100) had an AUC-ROC of 0.78 on the pure validation dataset, respectively. The systems and methods consistent with implementations of the current subject matter allow for machine learning models to be superior in performance, robust, and responsible to use compared to the models trained on available real world noisy datasets.

Figure 21:
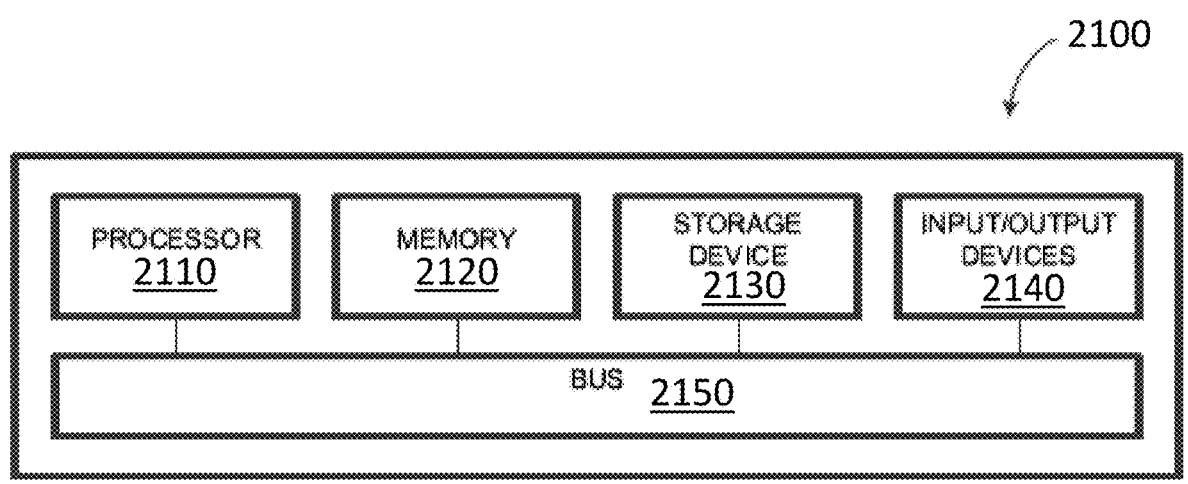
FIG. 21 depicts a block diagram illustrating an example of a computing system, consistent with implementations of the current subject matter.

FIG. 21 depicts a block diagram illustrating a computing system 2100 consistent with implementations of the current subject matter. Referring to FIGS. 1-21, the computing system 2100 can be used to implement the machine learning engine 110, the machine learning model 120, and/or any components therein.

As shown in FIG. 21, the computing system 2100 can include a processor 2110, a memory 2120, a storage device 2130, and input/output devices 2140. The processor 2110, the memory 2120, the storage device 2130, and the input/ output devices 2140 can be interconnected via a system bus 2150. The computing system 2100 may additionally or alternatively include a graphic processing unit (GPU), such as for image processing, and/or an associated memory for the GPU. The GPU and/or the associated memory for the GPU may be interconnected via the system bus 2150 with the processor 2110, the memory 2120, the storage device 2130, and the input/output devices 2140. The memory associated with the GPU may store one or more images described herein, and the GPU may process one or more of the images described herein. The GPU may be coupled to and/or form a part of the processor 2110. The processor 2110 is capable of processing instructions for execution within the computing system 2100. Such executed instructions can implement one or more components of, for example, the machine learning engine 110, the machine learning model 120, and/or the like. In some implementations of the current subject matter, the processor 2110 can be a single-threaded processor. Alternately, the processor 2110 can be a multi-threaded processor. The processor 2110 is capable of processing instructions stored in the memory 2120 and/or on the storage device 2130 to display graphical information for a user interface provided via the input/output device 2140.

The memory 2120 is a computer readable medium such as volatile or non-volatile that stores information within the computing system 2100. The memory 2120 can store data structures representing configuration object databases, for example. The storage device 2130 is capable of providing persistent storage for the computing system 2100. The storage device 2130 can be a floppy disk device, a hard disk device, an optical disk device, or a tape device, or other suitable persistent storage means. The input/output device 2140 provides input/output operations for the computing system 2100. In some implementations of the current subject matter, the input/output device 2140 includes a keyboard and/or pointing device. In various implementations, the input/output device 2140 includes a display unit for displaying graphical user interfaces.

According to some implementations of the current subject matter, the input/output device 2140 can provide input/output operations for a network device. For example, the input/output device 2140 can include Ethernet ports or other networking ports to communicate with one or more wired and/or wireless networks (e.g., a local area network (LAN), a wide area network (WAN), the Internet).

In some implementations of the current subject matter, the computing system 2100 can be used to execute various interactive computer software applications that can be used for organization, analysis and/or storage of data in various (e.g., tabular) format (e.g., Microsoft Excel®, and/or any other type of software). Alternatively, the computing system 2100 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 2140. The user interface can be generated and presented to a user by the computing system 2100 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A system comprising:
    at least one data processor; and
    at least one memory storing instructions, which when executed by the at least one processor result in operations comprising:
        generating synthetic data based on input data including a plurality of transactions; and a class assigned to each of the plurality of transactions, wherein the synthetic data is generated by at least:
            determining, for each class, a plurality of data points, each of the plurality of data points representing an archetype probability distribution of a plurality of archetypes for an entity at a time point, wherein the plurality of archetypes represent one or more transactional behavior patterns across the plurality of transactions;
            clustering, for each class, the plurality of data points into one or more clusters associated with the one or more transactional behavior patterns;
            removing, from the plurality of data points, one or more non-representative data points to define a reduced set of the plurality of data points, the removing based at least on a metric associated with the one or more non-representative data points failing to meet a threshold metric representing a peak distribution density of the plurality of data points associated with a corresponding cluster of the one or more clusters;
            generating an updated archetype probability distribution based at least on the reduced set of the plurality of data points; and
            generating representative transaction data based on the updated archetype probability distribution and the threshold metric, the representative transaction data defining the synthetic data; and
        training a machine learning model based on the generated synthetic data.

2. The system of claim 1, wherein the synthetic data is further generated by at least: tokenizing each transaction of the plurality of transactions to generate the plurality of archetypes.

3. The system of claim 2, wherein the plurality of archetypes are generated by at least applying a second machine learning model to a plurality of documents representing the plurality of tokenized transactions associated with unique entities in the transaction data.

4. The system of claim 1, wherein a first transaction of the plurality of transactions is associated with the entity and the time point.

5. The system of claim 1, wherein the plurality of data points are clustered into the one or more clusters by at least applying a clustering technique.

6. The system of claim 5, wherein the clustering technique includes k-means clustering with elbow method.

7. The system of claim 1, wherein the clustering comprises determining a centroid of the one or more clusters.

8. The system of claim 7, wherein the removing the one or more non-representative data points is further based on the one or more non-representative data points failing to meet a threshold distance from the centroid of the one or more clusters.

9. The system of claim 1, wherein the removing the one or more non-representative data points is further based on the one or more non-representative data points being associated with at least two classes.

10. The system of claim 1, wherein the synthetic data is further generated by at least re-clustering, for each class and after removing the one or more non-representative data points, the reduced set of the plurality of data points into one or more updated clusters associated with the one or more transactional behavior patterns.

11. The system of claim 1, wherein the synthetic data is further generated by at least generating summary statistics based on the reduced set of the plurality of data points; and applying the summary statistics to a simulated set of transactions corresponding to one or more simulated entities.

12. The system of claim 1, wherein the synthetic data is further generated by at least: defining for each of the one or more clusters including the reduced set of the plurality of data points, a centroid and a radius based on the threshold metric.

13. The system of claim 12, wherein the updated archetype probability distribution is further generated by at least leveraging the centroid, the radius, and the threshold metric.

14. The system of claim 1, wherein the representative generated transaction data corresponds to a statistical distribution of transactions associated with each archetype of the plurality of archetypes.

15. A computer-implemented method, comprising:
    generating synthetic data based on input data including a plurality of transactions; and a class assigned to each of the plurality of transactions, wherein the synthetic data is generated by at least:
        determining, for each class, a plurality of data points, each of the plurality of data points representing an archetype probability distribution of a plurality of archetypes for an entity at a time point, wherein the plurality of archetypes represent one or more transactional behavior patterns across the plurality of transactions;
        clustering, for each class, the plurality of data points into one or more clusters associated with the one or more transactional behavior patterns;
        removing, from the plurality of data points, one or more non-representative data points to define a reduced set of the plurality of data points, the removing based at least on a metric associated with the one or more non-representative data points failing to meet a threshold metric representing a peak distribution density of the plurality of data points associated with a corresponding cluster of the one or more clusters;
        generating an updated archetype probability distribution based at least on the reduced set of the plurality of data points; and
        generating representative transaction data based on the updated archetype probability distribution and the threshold metric, the representative transaction data defining the synthetic data; and training a machine learning model based on the generated synthetic data.

16. The method of claim 15, wherein the synthetic data is further generated by at least: tokenizing each transaction of the plurality of transactions to generate the plurality of archetypes.

17. The method of claim 15, wherein the synthetic data is further generated by at least: defining for each of the one or more clusters including the reduced set of the plurality of data points, a centroid and a radius based on the threshold metric.

18. The method of claim 17, wherein the updated archetype probability distribution is further generated by at least leveraging the centroid, the radius, and the threshold metric.

19. The method of claim 15, wherein the representative transaction data corresponds to a statistical distribution of transactions associated with each archetype of the plurality of archetypes.

20. A non-transitory computer-readable medium storing instructions, which when executed by at least one data processor, result in operations comprising:

generating synthetic data based on input data including a plurality of transactions; and a class assigned to each of the plurality of transactions, wherein the synthetic data is generated by at least:

determining, for each class, a plurality of data points, each of the plurality of data points representing an archetype probability distribution of a plurality of archetypes for an entity at a time point, wherein the plurality of archetypes represent one or more transactional behavior patterns across the plurality of transactions;

clustering, for each class, the plurality of data points into one or more clusters associated with the one or more transactional behavior patterns;

removing, from the plurality of data points, one or more non-representative data points to define a reduced set of the plurality of data points, the removing based at least on a metric associated with the one or more non-representative data points failing to meet a threshold metric representing a peak distribution density of the plurality of data points associated with a corresponding cluster of the one or more clusters;

generating an updated archetype probability distribution based at least on the reduced set of the plurality of data points; and generating representative transaction data based on the updated archetype probability distribution and the threshold metric, the representative transaction data defining the synthetic data; and training a machine learning model based on the generated synthetic data.

\* \* \* \* \*